Figure 1:
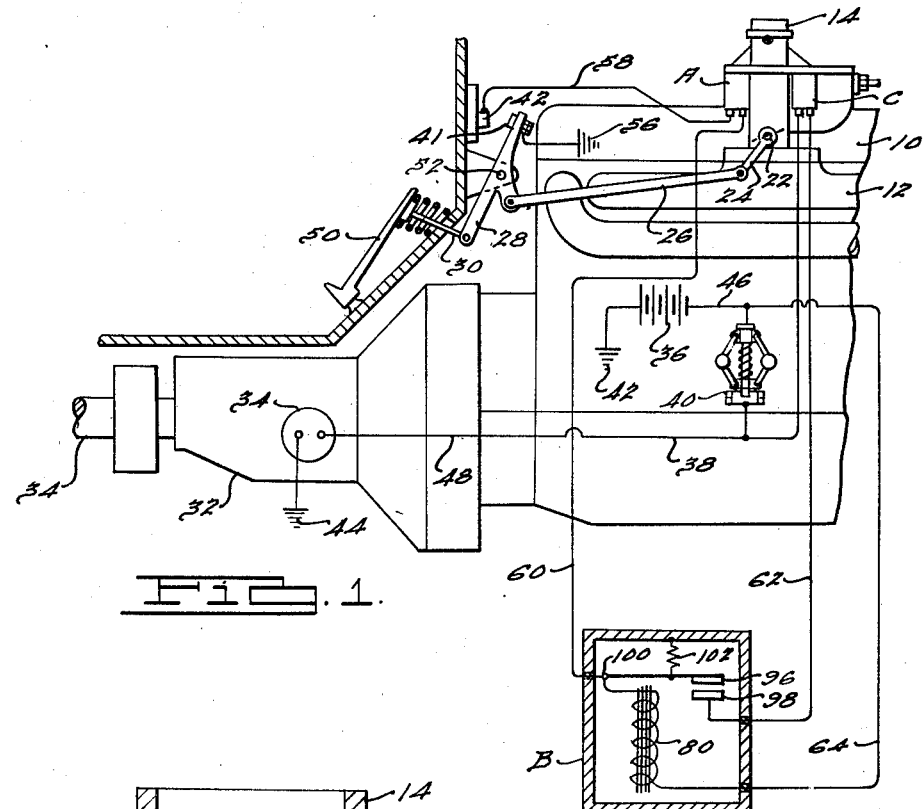

April 10, 1951     T. M. BALL     2,548,138
TRANSMISSION CONTROL APPARATUS
Filed May 17, 1947     2 Sheets-Sheet 1

INVENTOR.
Thomas M. Ball.
BY
Harness and Harris
ATTORNEYS.

April 10, 1951            T. M. BALL            2,548,138

TRANSMISSION CONTROL APPARATUS

Filed May 17, 1947            2 Sheets—Sheet 2

INVENTOR.
Thomas M. Ball.
BY
Harness and Harris
ATTORNEYS.

Patented Apr. 10, 1951

2,548,138

UNITED STATES PATENT OFFICE 2,548,138

TRANSMISSION CONTROL APPARATUS

Thomas M. Ball, Detroit, Mich., assignor to Chrysler Corporation, Highland Park, Mich., a corporation of Delaware Application May 17, 1947, Serial No. 748,858

11 Claims. (Cl. 74—472)

This invention relates to a transmission control mechanism for an automotive vehicle and more particularly to means to control the initiation of a change in transmission speed ratio drive.

Reference will be made herein to a relatively fast speed drive which is usually the cruising drive for a vehicle. This may, for example, be a one to one driving speed ratio known as a direct drive or an overdrive. Reference will also be made to a relatively slow speed drive which is a vehicle accelerating speed ratio drive and may be a torque multiplying drive or where an overdrive is provided for the relatively fast speed drive the relatively slow speed drive may be a direct drive. The term kickdown, as used herein, refers to a downshift or step-down in the transmission as, for example, a downshift from the relatively fast speed drive to the relatively slow speed drive.

In automotive vehicles having automatic controls associated with variable speed ratio transmissions it has been found desirable to provide means responsive to control by the operator for reverting to a relatively slow speed drive when the operator is confronted with an emergency demanding fast acceleration. Such means have usually included a solenoid actuator and controls therefor including a switch which is arranged to cooperate with the engine carburetor throttle control mechanism so as to cause a change in speed ratio drive of the vehicle when the usual accelerator pedal is depressed to a predetermined position. It has also been found with such arrangements that under certain conditions as where the vehicle is traveling at a comparatively high rate of speed the transmission cannot be safely operated in a relativey slow speed drive as above described due to the excessive engine speed which would be required. Means have heretofore been provided for limiting the operation of such controls to those engine and vehicle speeds in which a relatively slow speed drive may be safely accommodated.

It is an object of this invention to provide a first control for a variable speed ratio transmission by means of which a solenoid actuator associated with the transmission may be actuated to effect a change in transmission speed ratio drive by positioning the throttle control linkage in a predetermined position and to provide a supplemental vacuum controlled means to maintain the condition of said solenoid established by the first control and thereby to maintain the speed ratio drive effected by the solenoid after the throttle control linkage has been moved from the predetermined position.

It is a further object of the invention to control the above supplemental means by vacuum created between the throttle valve and the atmosphere during operation of the vehicle engine.

The transmissions illustrated and described in Patent No. 2,348,763 issued on May 16, 1944, to A. J. Syrovy et al. and the copending application Serial No. 374,674 of Neracher et al. are examples of transmissions to which the controls to be described herein may be applied. In these transmissions a mechanical means in the form of a snap switch and a lever associated with the throttle linkage and having a pair of spaced fingers is provided to maintain the speed ratio drive effected by the kickdown control until the operator signals his desire that a return be made to the higher speed ratio drive. The signal is effected by a release of the accelerator pedal above governor speed. This mechanical linkage increases the forces required to operate the throttle valve and is therefore undesirable. It is an object of this invention to substitute an electrical control which is responsive to the degree of vacuum existing between the throttle valve and the atmosphere to control the time of "upshift" or resumption of relatively fast speed drive. This electric control may be associated with the throttle linkage and operated without increasing the forces required to operate the throttle.

Figure 2:
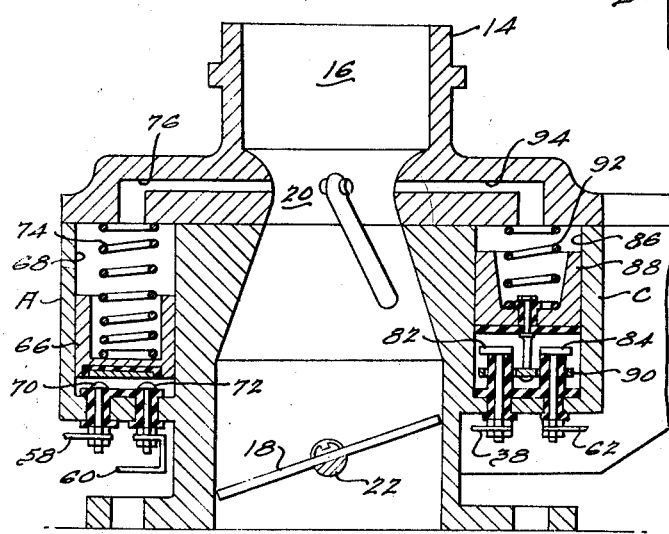
Figure 3:
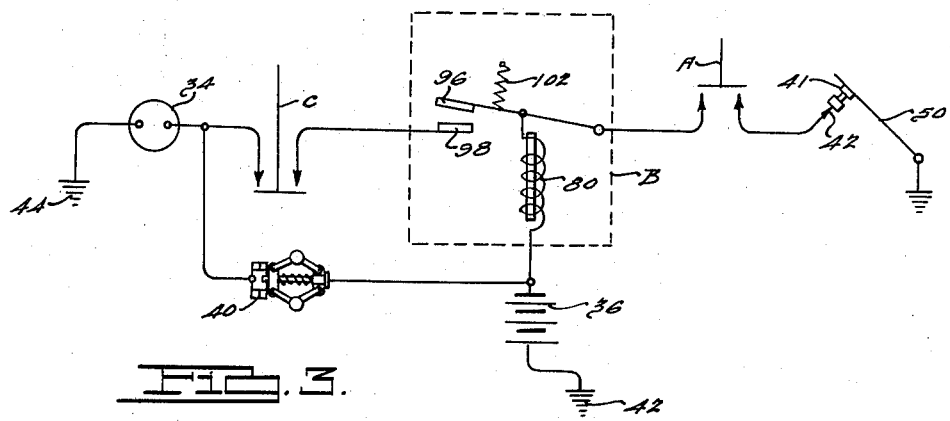
Figure 4:
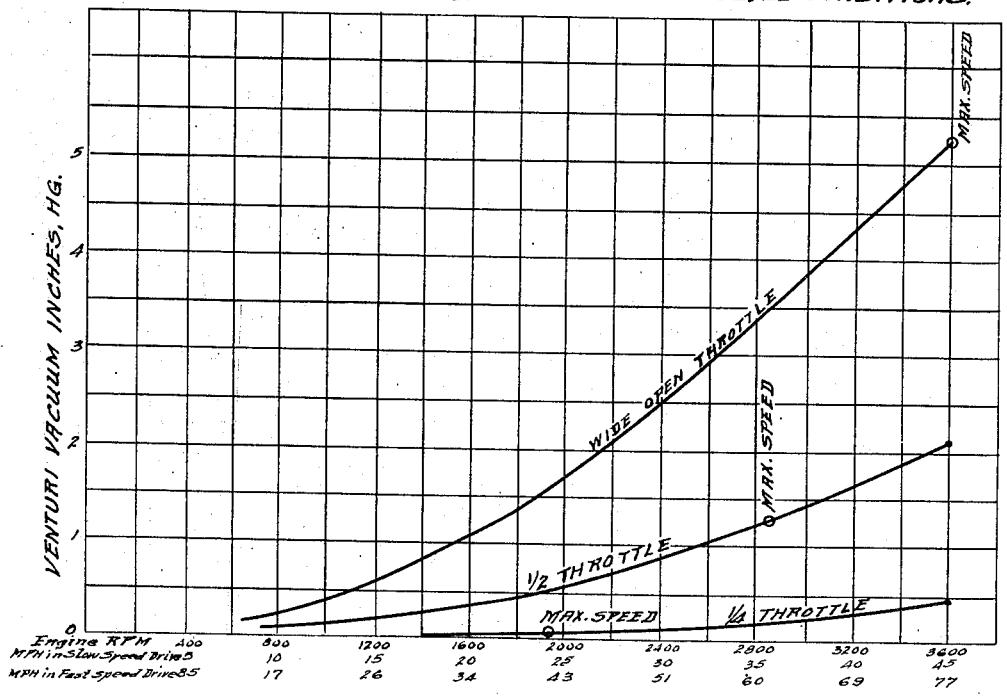

In the drawings:

Fig. 1 is a diagrammatic view showing a portion of an automotive engine including a carburetor and a power transmission with the present invention applied thereto, Fig. 2 is an enlarged section of the carburetor showing a pair of vacuum responsive switches associated therewith, Fig. 3 is a wiring diagram of the control system, Fig. 4 is a chart showing generally the relation of throttle opening and engine speed to Venturi vacuum which has been measured in inches of mercury.

Certain abbreviated terminology will be adopted herein to facilitate the description of the invention. The means associated with the throttle control linkage and which is adapted to cause a relatively slow speed drive to be effected will be hereinafter referred to as a kickdown control. The means which limits the operation of the kickdown control to certain engine and vehicle speeds will be referred to as an upper limit control.

It is apparent that the control desired herein should be associated with some manipulation of the throttle linkage which will signal the operator's desire for an upshift and yet permit some latitude of vehicle operation with respect to engine speed during the relatively slow speed drive. The control therefore should be designed to initiate an upshift as the throttle is brought towards a throttle closing position beyond the lower limit of throttle opening that would normally be desired in the operation of the vehicle in its relatively slow speed drive.

Manifold and Venturi vacuum are both available in an internal combustion engine. Venturi vacuum possesses characteristics which make it more desirable for control purposes than manifold vacuum. Manifold vacuum is the vacuum existing between the throttle valve and the engine cylinders. It is believed sufficient to point out that manifold vacuum generally is at its lowest degree of vacuum under wide open throttle conditions and that the greatest manifold vacuum is obtained under closed throttle conditions. Intermediate throttle conditions provide manifold vacuum between these extremes. Thus a manifold vacuum control would be dependent upon obtaining a high degree of vacuum. Operation of the vehicle at a high altitude might well render the required degree of vacuum beyond the reach of practical performance.

The control to be described herein is responsive to the vacuum existing between the throttle valve and the atmosphere or upstream of the throttle valve and preferably to the vacuum existing at the carburetor Venturi opening where the passage is restricted. This vacuum for convenience will be hereinafter referred to as Venturi vacuum. A Venturi vacuum control may be provided to initiate an upshift when a minimum of vacuum is obtained since at a given engine speed the Venturi vacuum is decreased when the throttle approaches a closed position. Thus although the effective altitude might vary the particular engine speed at which an upshift would occur it would never render the required Venturi vacuum inaccessible so that an upshift could not be obtained.

The numeral 10 generally indicates an internal combustion engine having an intake manifold 12 on which is mounted a carburetor 14. The carburetor is provided with a downwardly directed mixture conduit 16 and a mixture control valve or throttle 18. The downwardly directed mixture conduit 16 is provided with a restricted portion which is positioned above the throttle 18. This restricted portion is generally known as the Venturi opening in the carburetor and has been designated by the numeral 20. Linkage for remote control of the throttle is indicated at 22, 24, 26, 28 and 30.

A variable speed ratio transmission has been generally indicated by the numeral 32 and is positioned rearwardly of the engine 10 and adapted to transmit drive from the engine 10 to the propeller shaft 34 of the vehicle. Patent No. 2,348,763 and copending application Serial No. 374,674 illustrate transmissions which could be controlled by the apparatus to be described herein. A solenoid actuator 34 mounted on the side of the transmission may be associated with the transmission control apparatus so that energization of the solenoid actuator 34 will effect a kickdown or downshift of the transmission to a relatively slow speed drive. Deenergization of the solenoid actuator 34 may be utilized to effect an upshift of the transmission to a relatively fast speed ratio drive.

Electrical energy for the operation of the solenoid actuator 34 is supplied by the vehicle storage battery 36 through a circuit 38 which includes a governor switch 40 and a throttle actuated switch comprising terminals 41 and 42. The governor switch 40 may be of any suitable design which is operatively connected to a driven portion of the transmission or other vehicle speed responsive member. The governor switch 40 may be designed to be closed at low vehicle speeds and when a predetermined vehicle speed has been exceeded the effect of centrifugal force on the governor will cause the switch 40 to open. The storage battery 36 may have one terminal thereof grounded as at 42. The solenoid actuator 34 may have one terminal thereof grounded as at 44. There is provided a circuit which may energize and deenergize the solenoid actuator 34 in response to variations in vehicle speed. This circuit includes the grounded storage battery 36, line 46 connected to governor switch 40 and a line 48 connecting the governor switch with the grounded solenoid actuator 34.

Operation of the kickdown control to be discussed herein is limited to those occasions at which the predetermined vehicle speed controlling the governor 40 has been exceeded so that the switch 40 is opened. A kickdown control is not necessary below this predetermined speed as the governor provides the relatively slow speed drive.

An accelerator pedal 50 is operatively associated with the throttle linkage 22, 24, 26, 28 and 30. The lever 28 which forms a part of the throttle control linkage is pivoted at 52 to a stationary part of the vehicle and is provided with its terminal 41 adjacent one end thereof. The terminal 41 is adapted to contact the terminal 42 when the accelerator pedal 50 is manipulated to a predetermined position. The terminals preferably contact when the accelerator pedal 50 is depressed all the way so that the step down will occur as a natural result of manipulating the accelerator pedal for maximum power output. The terminal 41 is preferably grounded at 56. Line 58 connects terminal 42 with a vacuum responsive switch A which is associated with the carburetor 14. Line 60 connects the switch A with a relay device B. A line 62 connects one portion of the relay device B to a vacuum responsive switch C associated with the carburetor. The switch C is connected to the solenoid actuator 34 by the line 48. A line 64 connects a portion of the relay B to the line 46 and the grounded storage battery 36.

The switch A is the upper limit control switch. Switches performing this function are not in themselves new and have heretofore been associated with kickdown controls on automatic transmissions. The switch A comprises a movable piston element 66 which is slidably mounted in a cylinder 68 provided in the carburetor 14. Lines 58 and 60 are connected to a pair of terminals 70 and 72 provided in the housing of the carburetor 14. The piston element 66 is adapted to provide an electrical connection across terminals 70 and 72 when it is in its lowermost position. A passage 76 connects the cylinder 68 with the Venturi opening 20 in the carburetor 14. The switch A is normally urged to its closed position by the spring 74. When the Venturi vacuum becomes sufficiently great, air is withdrawn from the cylinder 68 through the passage 76 and the piston element 66 is lifted against the force of the spring 74. This breaks the electrical connection between lines 58 and 60. The vacuum becomes sufficiently great as the engine speed and throttle opening increase. This therefore provides an upper limit control responsive to vehicle speed and throttle opening and beyond which a kickdown cannot be effected by manipulation of the accelerator pedal 50.

Contacting the terminals 41 and 42 when the vehicle speed and throttle opening are sufficiently low so that the switch A is in its normally closed position provides a circuit for energizing the solenoid actuator 34. This circuit comprises the grounded storage battery 36 which may deliver current through the lines 46 and 64 through a solenoid 80 in relay element B to the line 60 and through the switch A to the line 58. The circuit is completed through the terminals 41 and 42 to the ground 56. When a kickdown to a relatively slow speed drive is effected through the energization of the solenoid actuator 34 a problem is presented because in normal operation the driver will desire to reduce the throttle opening. In so doing he will rotate the lever 28 and separate the terminals 41 and 42 of the kickdown switch. In view of the fact that the driver has just obtained a kickdown he would not want an upshift to a relatively fast speed drive to occur immediately upon his relaxation of pressure on the accelerator pedal. Means must be provided to retain the relatively slow speed drive even when the terminals 41 and 42 of the kickdown switch are separated. This means includes a switch C which is associated with the carburetor 14 and is responsive to Venturi vacuum. The switch C differs from the switch A in that it is normally open and is closed when the Venturi vacuum becomes sufficiently great. The switch C comprises terminals 82 and 84 which are connected to lines 38 and 62 respectively. A cylinder 86 is provided in the carburetor 14. A movable piston element 88 is slidably mounted in the cylinder 86. The piston element 88 carries a contact element 90 which is normally positioned below the terminals 82 and 84 when the piston element 88 is in its lower position. A spring 92 urges the piston element to this lower position. However, as the Venturi vacuum increases, air is withdrawn from the cylinder 86 through a passage 94 connected with the carburetor Venturi 20. The pressure differential thus created raises the piston element 88 and contacts the terminals 84 and 82.

Referring to the relay device B a pair of terminals 96 and 98 are illustrated. The terminal 98 is connected to the line 62. The terminal 96 is pivotally mounted at 100 and located in the magnetic field of the solenoid 80 in the line 64. A spring 102 normally holds the terminal 96 out of contact with the terminal 98. However, when the accelerator pedal is manipulated to contact the terminals 41 and 42 to effect a kickdown, the solenoid 80 is energized. This causes the terminal 96 to contact the terminal 98 to establish a secondary circuit adapted to energize the solenoid actuator 34 independently of the continued contact of terminals 41 and 42. Thus even though the operator may relax the pressure on the accelerator pedal and separate the terminals 41 and 42 the secondary circuit will be maintained and the solenoid actuator 34 energized to maintain the relatively slow speed drive. This secondary circuit permits current to flow from the grounded storage battery 36 through the lines 46 and 64, solenoid 80, terminal 96, terminal 98, line 62, switch C and line 38 to the grounded solenoid actuator 34. A deenergization of the solenoid actuator 34 which will effect an upshift in the transmission speed ratio drive above the predetermined governor speed will be obtained only when the switch C is opened. The switch C will be opened only when the Venturi vacuum becomes sufficiently small so that the spring 92 may return the piston 88 to its lower position. The Venturi vacuum becomes small when engine speed is reduced and when the throttle opening is decreased. The size of the spring 92 may be preselected so that an upshift will occur under selected conditions of vehicle speed and throttle opening.

Referring to Fig. 4 if the switch C is designed to open when the Venturi vacuum becomes less than $\frac{1}{8}$ of an inch of mercury then an upshift could be obtained at $\frac{1}{4}$ throttle if the vehicle speed in "slow speed drive" is less than about 33 miles per hour. If the switch C is designed to open at vacuums less than $\frac{1}{2}$ inch of mercury an upshift in the transmission speed ratio drive will be obtained with a wide open throttle when the vehicle speed is below about 14 miles per hour in "slow speed drive." This assumes that the predetermined speed controlled by the governor 49 is less than 14 miles per hour. An upshift also might be obtained with switch C designed to open at Venturi vacuums less than $\frac{1}{2}$ inch of mercury when the vehicle speed is below approximately 24 miles per hour at $\frac{1}{2}$ open throttle. At $\frac{1}{4}$ throttle sufficient speed would never be obtained with the engine plotted in Figure 4 to provide $\frac{1}{2}$ inch of mercury Venturi vacuum. Operation of the vehicle in the mountains or at high altitudes would increase the speed at which a particular throttle opening would produce an upshift, but an upshift could always be obtained. The Fig. 4 chart has been drawn for sea level conditions. By selecting a spring 92 of the desired strength the performance of the control may be predetermined.

I claim:

1. In a motor vehicle drive having an engine provided with a carburetor having a mixture conduit and a throttle valve in said conduit, throttle valve control linkage and a variable speed ratio transmission, a solenoid adapted to effect a first speed drive in said transmission when energized and adapted to effect a second speed drive in said transmission when deenergized, a first means including an electrical circuit associated with said throttle valve control linkage and adapted to energize and deenergize said solenoid in response to movement of said throttle valve control linkage, a second means including an electrical circuit and a switch in said circuit, said switch being operably responsive to sub-atmospheric pressure and third means operatively connecting said switch with said conduit on the atmospheric side of said throttle valve so that said second means is actuated by predetermined sub-atmospheric pressure conditions in said conduit related to throttle position and engine speed, said second means being adapted to change the condition of said solenoid established by said first means when a predetermined sub-atmospheric pressure is obtained in said conduit on the atmospheric side of said throttle valve.

2. In a motor vehicle having an internal combustion engine provided with a carburetor having a mixture conduit and a throttle valve in said conduit, throttle valve control linkage and a variable speed ratio transmission, a solenoid adapted to effect a first speed ratio drive in said transmission when energized and adapted to effect a second speed ratio drive in said transmission when deenergized, vehicle speed responsive means for energizing and deenergizing said solenoid in response to changes in vehicle speed, said vehicle speed responsive means being operative below a predetermined vehicle speed to establish a relativey slow speed drive for operation of said vehicle below said predetermined speed and being operative above said predetermined vehicle speed to establish a relatively fast speed drive for operation of said vehicle above said predetermined speed, a supplemental means adapted to overrule said vehicle speed responsive means above said predetermined speed and to render said solenoid operative to effect the said slow speed drive while the vehicle is being operated above said predetermined speed, said supplemental means being adapted to be actuated in response to movement of said throttle control linkage to a predetermined position, a control means operatively associated with said supplemental means and adapted to maintain said solenoid operative to effect said slow speed after said throttle control linkage is moved away from said predetermined position, said control means comprising an electric circuit adapted to be energized when said throttle control linkage is moved to said predetermined position, said circuit having a switch therein capable of breaking said circuit when open and means operably responsive to a predetermined sub-atmospheric pressure in said mixture conduit at the atmospheric side of said throttle valve and adapted to open said switch.

3. In a motor vehicle having an internal combustion engine provided with a throttle valve control linkage and a variable speed ratio transmission, a solenoid adapted to effect a first speed ratio drive in said transmission when energized and adapted to effect a second speed ratio drive in said transmission when deenergized, vehicle speed responsive means for energizing and deenergizing said solenoid in response to changes in vehicle speed, said vehicle speed responsive means being operative below a predetermined vehicle speed to establish a relatively slow speed drive for operation of said vehicle below said predetermined speed and being operative above said predetermined vehicle speed to establish a relatively fast speed drive for operation of said vehicle above said predetermined speed, a supplemental means adapted to overrule said vehicle speed responsive means above said predetermined speed and to render said solenoid operative to effect the said slow speed drive while the vehicle is being operated above said predetermined speed, said supplemental means being adapted to be actuated in response to movement of said throttle control linkage to a predetermined position, a control means operatively associated with said supplemental means and adapted to maintain said solenoid operative to effect said slow speed drive after said throttle control linkage is moved away from said predetermined position, said control means comprising an electric circuit adapted to be energized when said throttle control linkage is moved to said predetermined position, said circuit having a switch therein capable of breaking said circuit when open and means to open said switch when predetermined conditions of engine speed and throttle opening are obtained in the operation of the vehicle.

4. In a motor vehicle drive having an engine provided with a carburetor having a mixture conduit and a throttle valve in said conduit, throttle valve control linkage and a variable speed ratio transmission, a solenoid adapted to effect a first speed drive in said transmission when energized and adapted to effect a second speed drive in said transmission when deenergized, a first means including an electrical circuit associated with said throttle valve control linkage and adapted to energize said solenoid in response to movement of said throttle valve control linkage to a predetermined position, a second means including an electrical circuit and a switch in said circuit, said switch being operably responsive to sub-atmospheric pressure, a third means operatively connecting said switch with said conduit at a location on at the atmospheric side of said throttle valve whereby the circuit of said second means may be deenergized by said switch when predetermined sub-atmospheric pressure conditions related to throttle position and engine speed are obtained at said location, said second means being adapted to maintain the energization of said solenoid after an initial energization by said first means until a predetermined pressure condition is obtained in said third means regardless of movement of said throttle valve control linkage away from said predetermined position.

5. In a motor vehicle having an internal combustion engine provided with a carburetor having a Venturi opening and a throttle valve, throttle valve control linkage and a variable speed ratio transmission, a solenoid adapted to effect a relatively slow speed drive in said transmission when energized and adapted to effect a relatively fast speed drive in said transmission when deenergized, a vehicle speed responsive means adapted to energize said solenoid below a predetermined vehicle speed and to establish said slow speed drive below said predetermined vehicle speed and to establish said fast speed drive above said predetermined vehicle speed, a supplemental means adapted to overrule said vehicle speed responsive means and to energize said solenoid above said predetermined vehicle speed to effect said slow speed drive while the vehicle is traveling above said predetermined speed, said supplemental means being adapted to be actuated in response to movement of said throttle control linkage to a predetermined position, a limiting means adapted to render said supplemental means inoperative above a predetermined vehicle speed so that said slow speed drive will not be established when it would be undesirable because of an excessive vehicle speed, a control means operatively associated with said supplemental means and adapted to maintain the energization of said solenoid established by said supplemental means, said control means being operative to maintain said slow speed drive after said throttle control linkage is moved away from said predetermined position, said control means being operably responsive to a predetermined sub-atmospheric pressure and operatively connected to said carburetor Venturi whereby said control means is adapted to be actuated by a predetermined sub-atmospheric pressure condition in said Venturi opening which is established by throttle valve position and engine speed and to maintain said slow speed drive until said predetermined pressure condition is obtained in said Venturi opening.

6. In a motor vehicle having an internal combustion engine provided with a carburetor having a Venturi opening and a throttle valve, throttle valve control linkage and a variable speed ratio transmission, a solenoid adapted to effect a relatively slow speed drive in said transmission when energized and adapted to effect a relatively fast speed drive in said transmission when deenergized, a first electrical circuit including a source of electric energy, means operatively connecting said source and said solenoid for energization and deenergization of said solenoid, a vehicle speed responsive means for energization and deenergization of said first circuit in response to changes in vehicle speed, a second electrical circuit operatively connecting said source and said solenoid, a switch in said second circuit which is normally open, a third electrical circuit operatively connected to said source, said third circuit including a pair of terminals adapted to be contacted when said throttle valve control linkage is positioned in a predetermined position, a solenoid in said third circuit adapted to be energized when said terminals are contacted, said solenoid being operatively associated with said switch and adapted to close said switch when energized whereby the energization of said second circuit is dependent upon the initial contact between said terminals, means associated with said second circuit to maintain the energization of said solenoid independently of said first circuit whereby the initial energization of said second circuit through said first circuit may be continued independently of the energization of said first circuit, a second switch in said second circuit, means associated with said second switch operatively connecting said switch with said carburetor Venturi opening and adapted to close said second switch as long as a sub-atmospheric pressure of less than a predetermined amount exists at said Venturi opening, whereby the energization of said solenoid may be initiated above said predetermined speed by manipulation of said throttle valve control linkage to a predetermined position associated with a contact between the terminals in said first circuit and the energization of said solenoid will be maintained by said second circuit as long as a sub-atmospheric pressure of less than a predetermined amount is maintained at said carburetor Venturi opening and when said pressure exceeds said predetermined amount said second switch in said second circuit will open to deenergize said solenoid and return said transmission to said relatively fast speed drive if said third circuit is inoperative due to the operation of said vehicle above said predetermined vehicle speed.

7. In a motor vehicle having an internal combustion engine provided with a carburetor having a Venturi opening and a throttle valve, throttle valve control linkage and a variable speed ratio transmission, a first solenoid adapted to effect a relatively slow speed drive in said transmission when energized and adapted to effect a relatively fast speed drive in said transmission when deenergized, a source of electrical energy, a second solenoid operatively connected to said source, a pair of terminals associated with said throttle valve control linkage and adapted to be contacted when said linkage is in a predetermined position, a switch adapted to be closed when said second solenoid is energized, a first electrical circuit including said source, said second solenoid and said terminals, a second electrical circuit including said source, said second solenoid, said switch and said first solenoid, whereby said first circuit may energize said first solenoid when said throttle valve control linkage is positioned in its predetermined position and the energization of said second solenoid will close said switch and establish said second circuit which will energize said second solenoid and said second circuit independently of said first circuit, a second switch in said second circuit, said second switch being operably responsive to a predetermined sub-atmospheric pressure and operatively connected to said Venturi opening and being adapted to interrupt said second circuit when the pressure in said Venturi opening increases in intensity above a predetermined maximum whereby the energization of said first solenoid and the establishment of said slow speed drive may be initiated by manipulation of said throttle valve control linkage to said predetermined position and the energization of said first solenoid and said slow speed drive may be maintained as long as the engine speed and throttle position are maintained in a predetermined relation capable of producing the requisite pressure in said Venturi opening.

8. In a motor vehicle having an engine provided with a carburetor having a mixture conduit and a throttle valve in said conduit, throttle valve control linkage and a variable speed ratio transmission, a solenoid adapted to effect a first speed drive in said transmission when energized and adapted to effect a second speed drive in said transmission when deenergized, a first means including an electrical circuit associated with said throttle valve control linkage and adapted to energize said solenoid in response to movement of said throttle valve control linkage to a predetermined position, said circuit including a second solenoid, means to maintain the energization of said first mentioned solenoid after said linkage is moved away from said predetermined position including a relay circuit adapted to be energized by energization of said second solenoid and to remain energized after said linkage is moved away from said predetermined position and said second solenoid is deenergized, a normally closed switch in said second circuit and means operably responsive to a predetermined sub-atmospheric pressure at a location in said conduit upstream of said throttle valve to open said switch and deenergize said second circuit and said first mentioned solenoid to thereby restore said first speed drive when said predetermined sub-atmospheric pressure is obtained.

9. In a motor vehicle having an engine provided with a carburetor having a mixture conduit and a throttle valve in said conduit, throttle valve control linkage and a variable speed ratio transmission, a solenoid adapted to effect a first speed drive in said transmission when energized and adapted to effect a second speed drive in said transmission when deenergized, a first electrical circuit including a first electrical relay switch, said circuit being operable when energized to energize said solenoid, a second electrical circuit including a second switch associated with said throttle valve control linkage and adapted to be closed when said linkage is moved to a predetermined position and including a second solenoid associated with said first relay switch and adapted to close the latter in response to energization of said first circuit, a normally closed third switch interposed in said first circuit and means operably responsive to a predetermined sub-atmospheric pressure in said mixture conduit at the atmospheric side of said throttle valve and adapted to open said third switch, said first circuit being dependent upon said second circuit for initial energization, but thereafter being controlled by said third switch and said means independently of subsequent deenergization of said second circuit.

10. In a motor vehicle having an engine provided with a carburetor having a mixture conduit and a throttle valve in said conduit, throttle valve control linkage and a variable speed ratio transmission, a solenoid adapted to effect a first speed drive in said transmission when energized and adapted to effect a second speed drive in said transmission when deenergized, a vehicle speed responsive means for energizing and deenergizing said solenoid in response to changes in vehicle speed, said vehicle speed responsive means being operative at a predetermined vehicle speed to establish a relatively fast speed drive for operation of said vehicle above said predetermined speed, a supplemental means adapted to overrule said vehicle speed responsive means and to render said solenoid operative to effect a relatively slow speed drive while the vehicle is being operated above said predetermined vehicle speed, said supplemental means comprising a first electrical circuit including a first electrical relay switch, said circuit being operable when energized to energize said solenoid, a second electrical circuit including a second switch associated with said throttle valve control linkage and adapted to be closed when said linkage is moved to a predetermined position and including a second solenoid associated with said first relay switch and adapted to close the latter in response to energization of said first circuit, a normally closed third switch interposed in said first circuit and means operably responsive to a predetermined sub-atmospheric pressure in said mixture conduit at the atmospheric side of said throttle valve and adapted to open said third switch, said first circuit being dependent upon said second circuit for initial energization, but thereafter being controlled by said third switch and said means independently of subsequent deenergization of said second circuit.

11. In a motor vehicle having an engine provided with a carburetor having a mixture conduit and a throttle valve in said conduit, throttle valve control linkage and a variable speed ratio transmission, a solenoid actuator for varying the speed ratio drive of said transmission between a relatively slow speed drive and a faster speed drive, means to actuate said solenoid to obtain said relatively slow speed drive including first and second electrical circuits, said first circuit comprising switch means associated with said throttle control linkage and adapted to be closed by movement of said linkage to a predetermined position, a source of electricity and a second solenoid controlling a relay switch adapted to be closed when said second solenoid is energized in response to closing of said switch means, said second circuit including a source of electricity, said relay switch, said first mentioned solenoid and a third switch capable of breaking said second circuit when open and means operably responsive to a predetermined sub-atmospheric pressure in said mixture conduit at the atmospheric side of said throttle valve and adapted to open said third switch whereby after initial energization of said first circuit and said second circuit said second circuit controls said solenoid actuator independently of said first circuit and said throttle control linkage.

THOMAS M. BALL.

REFERENCES CITED

The following references are of record in the file of this patent:

UNITED STATES PATENTS

| Number | Name | Date |
| --- | --- | --- |
| 2,225,493 | Barnes | Dec. 17, 1940 |
| 2,255,020 | Barnes | Sept. 2, 1941 |
| 2,281,916 | Claytor | May 5, 1942 |
| 2,296,646 | Matulaitis | Sept. 22, 1942 |
| 2,425,890 | Matulaitis | Aug. 19, 1947 |